United States Patent [19]

Delasantos et al.

[11] 4,354,580
[45] Oct. 19, 1982

[54] WHEEL CHOCKING ASSEMBLY

[76] Inventors: Clifford J. Delasantos, 4380 Benito, Montclair, Calif. 91763; Peter J. Rasmussen, 10714 Western Ave., Downey, Calif. 90241

[21] Appl. No.: 104,874

[22] Filed: Dec. 18, 1979

[51] Int. Cl.³ ............................. B60T 1/00; B60T 3/00
[52] U.S. Cl. .................................................. 188/4 R
[58] Field of Search ...................... 188/4 R, 5, 23, 32, 188/36; 104/257; 293/7

[56] References Cited

U.S. PATENT DOCUMENTS 2,693,252  11/1954  Bert .................................... 188/4 R
2,957,549  10/1960  Nesselberger ...................... 188/4 R
3,086,619  4/1963   Grotz ................................. 188/4 R
3,176,798  4/1965   Nesselberger ...................... 188/4 R Primary Examiner—Jeffrey V. Nase
Attorney, Agent, or Firm—G. W. Wasson

[57] ABSTRACT

A wheel chocking assembly for a vehicle or vehicle trailer. The chocking assembly includes apparatus mounted to the underside of the vehicle and the chock positioning assembly expands to place the chock in position and contracts into a protected position when not in use. Air actuated pistons operate to expand and contract the chocking assembly.

9 Claims, 8 Drawing Figures

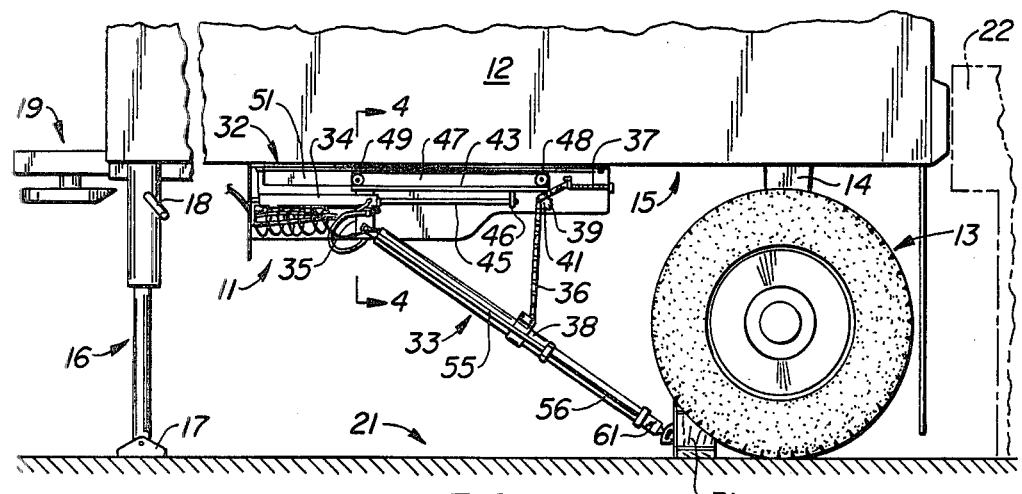
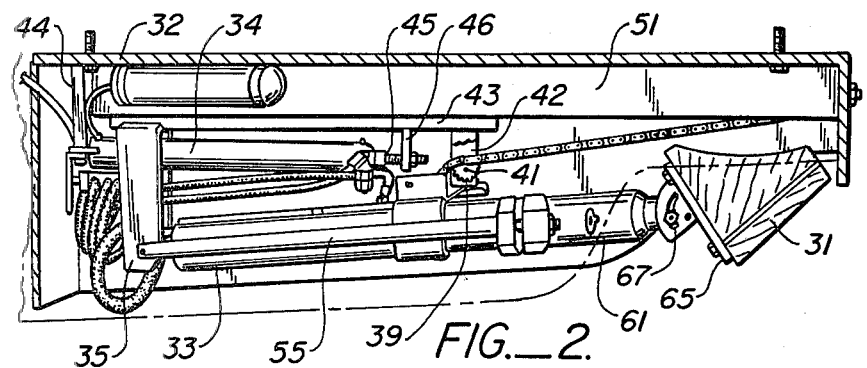
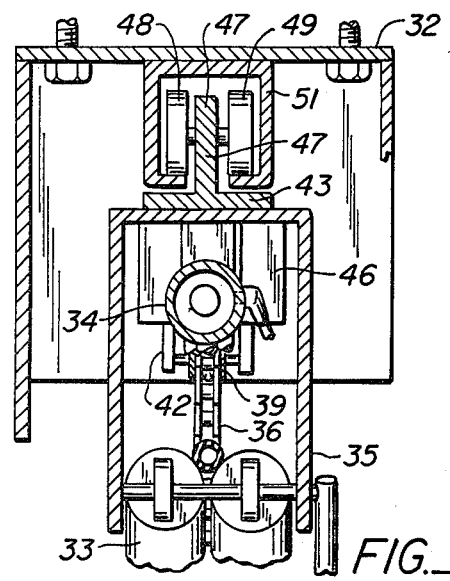

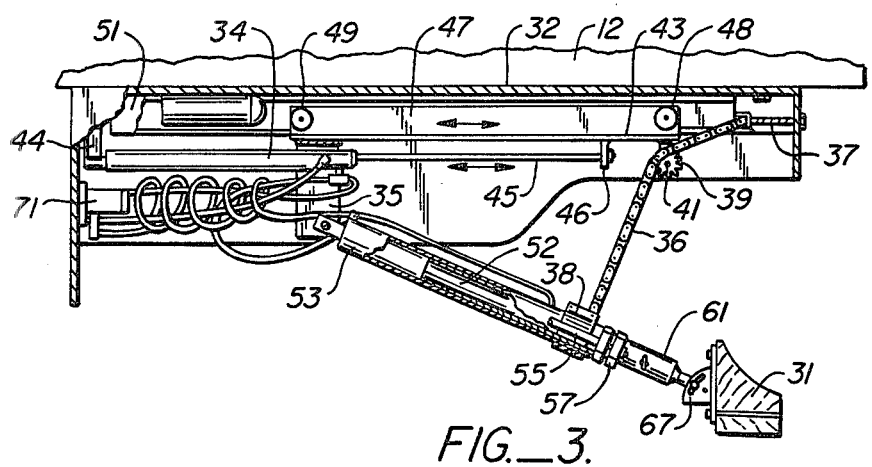
FIG._3.
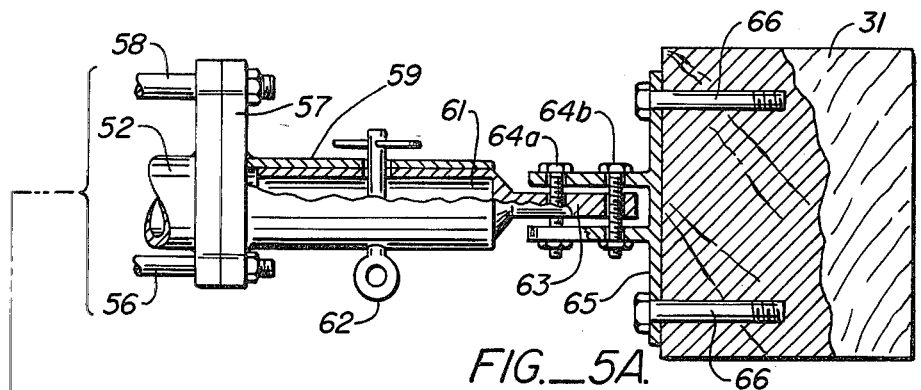
FIG._5A.
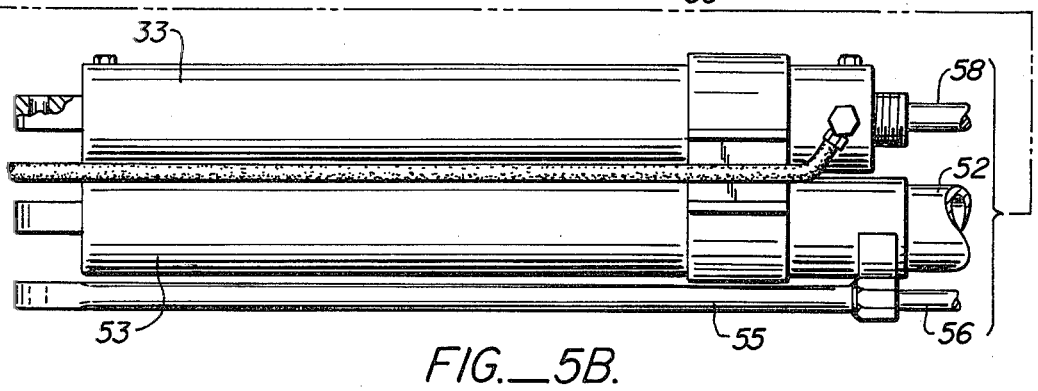
FIG._5B.

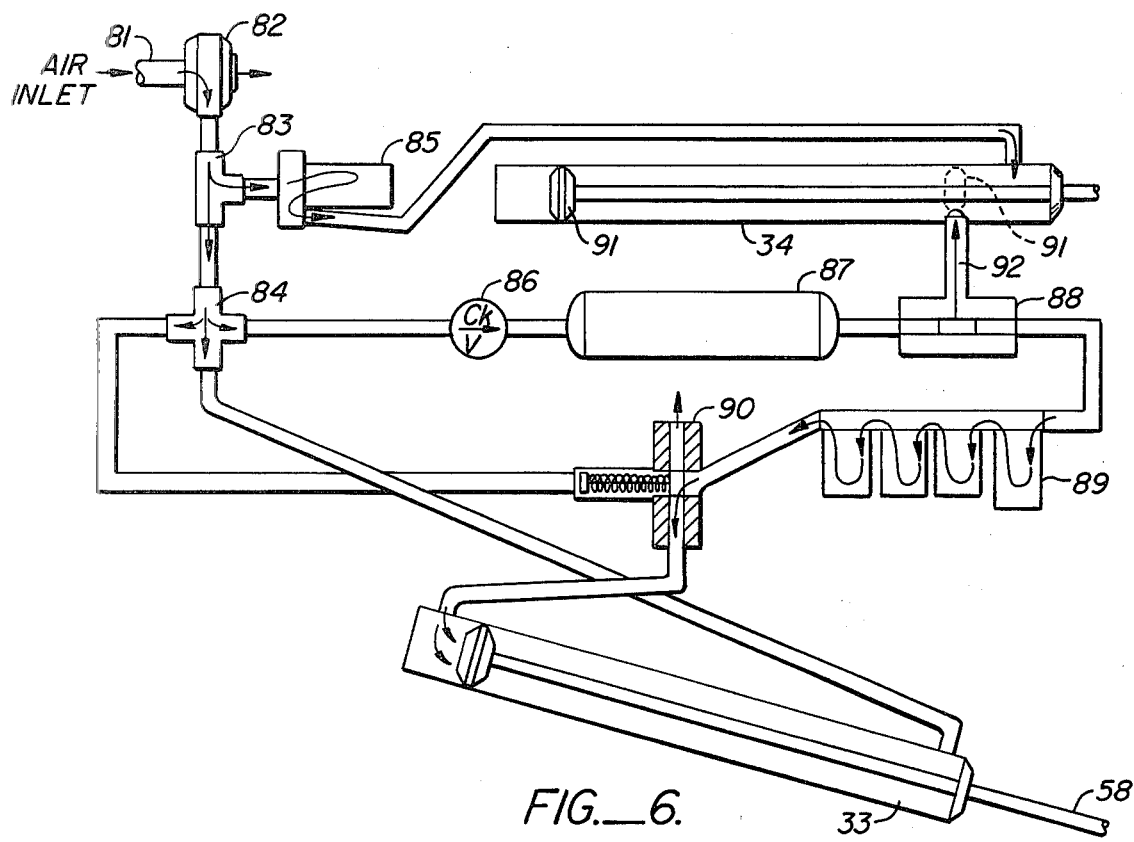
FIG._6.
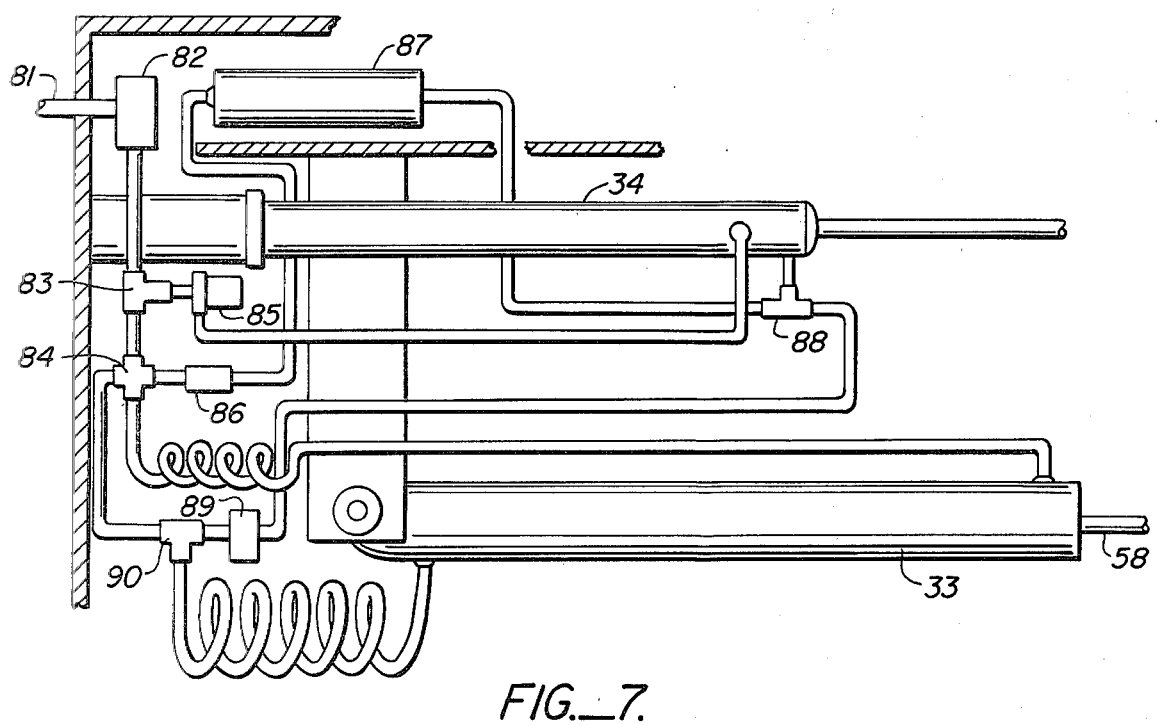
FIG._7.

WHEEL CHOCKING ASSEMBLY

FIELD OF THE INVENTION

This invention relates to a vehicular chocking apparatus, and more particularly, to such an assembly for use in providing positive chocking for the trailer portion of a vehicle. The assembly herein proposed is intended for mounting on the underside of a vehicle so as to provide a means for chocking the vehicle wherever it is parked. The apparatus may also be on any vehicle, whether a trailer or not.

BACKGROUND OF THE INVENTION

Modern vehicles are normally supplied with braking systems that function to maintain the vehicle in a fixed position. Such systems usually operate on the wheels of the vehicle and are intended to prevent the wheels from rotating.

In addition to the braking system many vehicles, and particularly cargo vehicles such as trailers of a tractor-trailer combination, are provided with wedge shaped chocks that are manually placed in front or behind the wheel of the vehicle when it is parked. While the use of such a chock serves the function of preventing run away of a vehicle, chocks are not always available when the vehicle is parked.

To overcome that disadvantage of the prior art basic system, the chocking means of the present invention is mounted on the vehicle so as to move with the vehicle.

The prior art chocking systems are only as effective as the engagement between the chock and the vehicle wheel. Separate wheel chocks can be and are placed at the wheel usually by the vehicle operator. The chock is hand wedged against the wheel and road surface. If the vehicle moves, the wedge may also move and can fail in its function.

The chocking means of the present invention provides a positive and continuous force working between the vehicle frame and the vehicle wheel to provide a more secure chocking of the vehicle wheel.

In a prior application of the present inventors, Ser. No. 792,903, filed May 2, 1977, now abandoned, a chocking means fixed to the underside of a vehicle was proposed. In that application the chocking means was hanging from the vehicle and was spring loaded to engagement with the vehicle wheel and road surface in chocking position. Part of that system was retracted to storage position but the elements of the system were still exposed to possible external damage.

The present invention overcomes the disadvantage of our prior system by collapsing the entire assembly into a compact protected position parallel to the underside of the vehicle. Further, the present invention provides an improved control for the operation of the improved wheel chocking apparatus.

OBJECTS OF THE INVENTION

It is an object of the present invention to provide a vehicle wheel chocking means attached to the underside of a vehicle in a position to be stored in a compact configuration and to be expanded to engagement between the vehicle frame and the contact of a wheel of the vehicle with a road surface.

A further object of the present invention is to provide positive control means for the wheel chocking means of the preceding object.

Another object of the present invention is to provide a wheel chocking means including means for positively forcing said chocking means into engagement with the parked wheels of the vehicle on which the means is mounted.

Another object of the present invention is to provide control means for collapsing the chocking means into a compact configuration at the underside of the vehicle on which the chocking means is mounted.

Further objects and features of the present invention will be fully apparent to those skilled in the art from the specification and appended drawings illustrating a certain preferred embodiment in which:

FIG. 1 is a side elevational view of a representative vehicle showing the chocking means in expanded, operating position chocking the wheels of the parked vehicle.

FIG. 2 is an enlarged partial sectional view of the chocking means in collapsed stored position.

FIG. 3 is a view of the chocking means in an intermediate position between expanded and collapsed position.

FIG. 4 is a sectional view taken along the lines 4—4 of FIG. 1.

FIGS. 5A and 5B are a top plan view of a portion of the chocking means showing the means for moving the chock into engagement with the vehicle wheel.

FIG. 6 is a schematic diagram illustrating the relationship of the operating air system of the present invention.

FIG. 7 is an assembly view, partially in section, illustrating the relative position of the elements of the operating air system.

Referring now to the drawings wherein a preferred embodiment of the present invention is shown mounted on the underside of a vehicle, as herein illustrated, the chocking means, generally designated 11, is mounted on the underside of a trailer vehicle 12, having a set of wheels 13 mounted by suitable means 14 to the underside or frame 15. The trailer here illustrated has a conventional skid 16 with a foot 17 and operating means 18. The trailer also includes the conventional fifth wheel system 19 for connection of the trailer 12 to a tractor vehicle. The trailer vehicle is shown supported on a road surface 21 and adjacent to a loading dock 22 or the like.

It should be understood that while the present invention is described as mounted on a trailer vehicle it will be equally useful with other vehicles. The trailer has been selected for description here because a trailer is less likely to have its own effective braking and blocking systems. Furthermore, the system described herein is effective to prevent trailer run-away due to air leakage in the braking system.

The chocking means of the present invention comprises a chock block 31 and operating mechanism mounted with a frame 32 fixed by suitable means to the underside or frame 15 of the trailer 12. The operating mechanism includes a pair of expandable members in the form of pistons 33 and 34 mounted in operating relationship to the frame 32. Piston 33 controls the positioning of the chock 31 against the wheel 13 of the vehicle and piston 34 controls the alignment of the support of piston 33 and functions in the procedure of positioning and retracting chock 31. A fixed end of piston 33 is mounted to a bracket 35 moved laterally by operation of piston 34. A flexible support member 36, here shown as a link chain, is fixed at one end to the frame 32 at an adjustable connector 37 and at its other end to a clamp 38 on the piston 33. The flexible member 35 cooperates with a sprocket 39 rotatable on a shaft 41 journaled in a bracket 42 fixed to a movable carrier element 43 moved with operation the piston 34.

Piston 34 has a fixed end attached to a bracket portion 44 of the frame 32. The moveable end of piston 34 is rod 45 attached to a bracket portion 46 of the moveable element 43.

Referring now to FIG. 4, the moveable element 43 as illustrated comprises a member having a cross-section of an inverted T shape with an upward extending leg 47. Shafts passing through the upright portion of the leg 47, at each end, supports a pair of wheels 48 and 49. The wheels operate within a guide member 51 so as to permit element 43 to move laterally along the guide member. As previously described, bracket 35 supporting one end of the first piston 33 and bracket 42 supporting the rotatable sprocket 39 are both fixed, by means not shown, to the underside of the moveable element 43.

FIGS. 5A and 5B illustrate the mechanism which positions the chocking member 31 into engagement with the wheel 13 and the roadway surface 27. The preferred form of mechanism includes a piston 33 air operated in both directions to position the chock 31 in wheel engaging position and to return it to stored position. Operation of piston 33 moves operator 58 into or out of the piston. A bracket 57 is secured to the operator 58 at the moveable end. Mounted in tandem with piston 33 is a mating pair of cylinders 52 and 53 and a tubular guide 55 enclosing a rod 56. The cylinders 52 and 53 function as the guides for the chock 31 and the guide 55 and rod 56 provide rigidity and stability to the chocking means.

A hollow tubular member 59 is secured to the bracket 57 and a chock handle member 61 is secured within the member 59 by a removable pin 62 passing through both the handle and the member. The end of the handle 61 is formed into an extension 63 extending beyond the member 57 to provide means for mounting the chock 31 to the handle. The mounting means includes a pair of holes through the extension 63 adapted to cooperate with locking bolts 64a and 64b. A bracketed plate 65 is fixed to the chock 31 by means such as bolts or pins 66 and an arcuate slot at 67 in the plate cooperates with the locking bolt 64a to provide for adjustable positioning of the chock.

Both of the cylinders 33 and 34 are maintained in their collapsed position when air pressure is applied to the system. When air pressure is released the pistons of each cylinder are moved toward the chocking position, In the case of piston 33, the initial force moving the piston 58 out of the cylinder is the weight of the chocking device. As shown in FIG. 1 the piston 33 is rotated clockwise about its pivot on bracket 35 due to the weight of the chocking means. As the cylinder 52 moves out of the cylinder 53 the chock 31 is moved toward chocking position. As the action proceeds, the flexible member 36 applies a force on sprocket 39 causing a force to be applied to member 47 causing it to be moved toward the right as viewed in FIG. 1. That movement draws piston 45 out of cylinder 34 and eventually permits the chock 31 to be moved to engaged position with wheel 13 on the road surface 21.

FIGS. 1, 2 and 3 illustrate the wheel chocking means in operating (FIG. 1), stored (FIG. 2) and an intermediate position (FIG. 3). FIGS. 6 and 7 illustrate an air operating system for moving the chocking means between operating and stored positions and visa versa.

The elements are designed and the air operating system is sequenced to cause the chocking means to move from stored position to chocking position in a sequence after the operating system is actuated. Cylinders 33 and 34 are air operated from an air source and maintained under air pressure in contacted position when the system is stored. When the vehicle wheel is to be chocked, the maintaining air pressure is removed from cylinders 33 and 34 and the weight of cylinder 33 and the chock member cause the cylinder 33 assembly to rotate about the pivoted support on bracket 35. That movement exerts a force on piston 45 through flexible member 36 and sprocket 39 and causes the piston to be withdrawn from cylinder 34. Movement of piston 45 causes air to be exhausted from cylinder 34 and, when fully withdrawn, the plunger within the cylinder causes a valve to be open to release compressed air from a storage source to cylinder 33 to extend the piston 58 and positively position chock 31 against the wheel 13.

When the chock is to be withdrawn from chocking position and returned to stored position, cylinder 33 is first connected to a source of compressed air to withdraw the piston 58 and release the chock. Then cylinder 34 is operated to withdraw piston 45 and return the entire system to stored position.

FIG. 6 illustrates the air operating system for accomplish the foregoing procedure. Operating air pressure is supplied through air inlet 81 through an exhaust valve 82. Exhaust valve 82 operates to maintain pressure within the system when the system is in stored position. When the system is actuated to initiate chocking, exhaust valve 82 is opened to permit quick exhaust of pistons of the system. When in stored position air from inlet 81 through valve 82 is supplied to the inside of cylinder 33 through connector 83 and fitting 84 to withdraw its piston and rod 58. Air from inlet 81 is also supplied through connector 83 and through delay valve 85 to cylinder 34 to withdraw its piston and rod 45. In stored position, air from inlet 81 is supplied through fitting 84 to a one-way check valve 86 to reservoir tank 87 to establish locking air pressure through a check valve 88 to cylinder 33 when in chocking position. In that operation, air from reservoir 87 is supplied through check valve 88 (opened when cylinder 34 is expanded), delay valve 89, and check valve 90 to the inside of cylinder 33.

FIG. 7 illustrates the air piping system to the cylinders 33 and 34 in stored position. In that position, as shown in FIG. 6, the compressed air from air inlet 81 is supplied to the cylinders 33 and 34 to cause both to be contracted. When the chocking system is to be operated, air from inlet 81 is withdrawn and cylinder 33 begins to expand under its own weight. As previously described, the expansion of cylinder 33 causes piston 45 to be withdrawn from cylinder 34. When piston head 91 in cylinder 34 is drawn to the position shown in dotted lines, it operates pin actuator 92 to open check valve 88. At that time compressed air from reservoir 87 is supplied through check valve 88, delay valve 89 and check valve 90 to the cylinder 33.

Delay valve 89 serves a specific purpose, that of delaying actuation of cylinder 33 for a specific period of time. The time delay is intended to prevent undesired wheel chocking when the vehicle loses its air pressure, either accidentally or intentionally when still moving. The delay permits the vehicle operator to move the vehicle during the time delay to remove it from an undesirable location. For example, should the vehicle lose its compressed air, it brakes will lock, but the vehicle can be moved during the time delay before the chocking system will be fully operated to chock the wheel.

Check valve 90 is open to air from reservoir 87 during chocking and open to exhaust air from cylinder 33 when the system is being collapsed.

When the time delay of valve 89 has expired and cylinder 33 is expanded by air from reservoir 87, piston 58 is moved to full stroke in cylinder 33 and cylinder 52 and rod 56 are full stroke out of cylinder 53 and guide 55 respectively. Chock 31 should then be engaged with wheel 13 and the roadway 21.

When the chocking system is to be withdrawn to stored position, compressed air is supplied through air inlet 81. The compressed air first operates on piston 58 in cylinder causing it to be retracted exhausting air through check valve 90. Delay valve 85 withholds air from cylinder 34 until cylinder 33 has been retracted sufficiently to disengage the chock 31 from wheel 13. After the prescribed delay, air pressure is supplied to cylinder 34 to retract its piston 45 thus closing valve 88. The travel of piston 58 in cylinder 33 and piston 45 in cylinder 34 is related so that piston 58 is fully retracted before travel of piston 45 is completed. The travel of piston 45 causes moveable element 43 to move bracket 35, sprocket 39 and flexible member 36 to collapse the chocking system into its storage frame 32.

The operation of the chocking system should be fully evident from the foregoing description of the components. As illustrated in FIG. 1, the system is adapted to be mounted on the underside of a vehicle in a position to provide a chocking operation with the vehicle's wheels. A specific use of the system is to maintain a trailer in a fixed position such as against a loading dock, as shown in phantom at 22 in FIG. 1. The usual procedure for docking the trailer 12 involves backing into contact with the dock 22 placing the support 16 in position and releasing the trailer hitch 19 from the tractor (not shown). When the air hoses have been released from the tractor and the trailer's brakes have been set, the tractor may be moved and separated from the trailer.

While a trailer is usually equipped with adequate brakes, it has become standard safety practice to chock the wheels to prevent run-away movement. With the system of the present invention, the air pressure holding the chocking system in stored position is released from exhaust valve 82 and the piston controlling the chock 31 begins to expand, being moved by the weight of the elements, to move chock 31 toward contact with wheel 13 and road surface 21. Because the system is designed for and carried with the trailer it automatically places chock 31 in the desired position.

When the trailer is to be returned to duty it is first mounted to the fifth wheel of a tractor and the air hoses and electrical connectors are hooked back into operating position. When air pressure has been generated to the required pressure, the system is operated collapsing piston 33 and eventually, when delay valve 85 is opened so that air pressure is supplied to piston 34, to return the chocking system to its stored position.

The chocking system is provided with several adjustable features including, a threaded support 37 for the flexible member 36 to provide an adjustment for the downward position of chock 31, and a rotatable adjustment at 64a in the mounting of chock 31 on extension 63 provides an adjustment for the position of the chock against the wheel and road surface.

The chock 31 may also be removed from the system by removing pin 62 and withdrawing the plug member 61. The chock may then be placed in any position to chock the wheel of the trailer.

The chocking system of the present invention, when contracted, is totally protected by frame 32, as shown in FIG. 2, so that debris picked up by or rotating with the trailer tires (such as a loose tread) will not damage the chocking elements.

While not illustrated, because it forms no essential part of this invention, it should be understood that suitable interconnect systems are provided to assure that the trailer is properly connected to the tractor before the wheel chocking system can be contracted.

While a certain preferred embodiment of the invention has been specifically disclosed, it should be understood that the invention is not to be limited thereto as many variations will be readily apparent to those skilled in the art and the invention is to be given its broadest possible interpretation within the terms of the following claims. While shown and described as mounted on and operating to chock a wheel of a trailer, the chocking means is equally effective in chocking any wheeled vehicle where the operating mechanism may be mounted on the vehicle and may operate between the vehicle and a wheel.

What is claimed is:

1. A wheel chocking means for a wheeled vehicle having a frame and at least one set of wheels supporting said frame and engaging a roadway surface, comprising:
   (a) a chock member;
   (b) a collapsable and expandable carrying means for said chock mounted to the underside of said vehicle in a position so as to be parallel to the frame of said vehicle when in the collapsed position and diagonally between the frame of said vehicle and at least one wheel of said vehicle and the roadway surface when in expanded chocking position;
   (c) said chock carrying means including a first expandable member having a pivoted end fixed to a laterally moveable element moveable attached to said frame of said vehicle and a free end moveable away from and toward said pivoted end, a flexible member connected at one end to said first expandable member at a point spaced from said pivoted end and connected at its other end to another portion of said frame of said vehicle, said free end of said first expandable member having said chock member attached thereto for engagement with said wheel and said roadway surface;
   (d) said chock carrying means further including a second expandable member fixed at one end with respect to said frame of said vehicle and having a free end moveable away from and toward said fixed end, said moveable end of said second expandable member connected to said laterally moveable element to which the pivoted end of said first expandable member is attached, and means attached to said laterally moveable element and cooperating with said flexible member between said other end thereof and said one end connected to said first expandable member;
   (e) means for expanding said first expandable member and for moving said laterally moveable element with respect to said fixed end of said second expandable member and for moving said chock member into chocking engagement with said wheel; and (f) control means for collapsing said first expandable member away from said chocking engagement and then for collapsing said second expandable member to move said laterally moveable element toward the fixed end of said second expandable member and for moving said means cooperating with said flexible member toward the end connected to said first expandable member.

2. The apparatus of claim 1 wherein said control means maintains said chock carrying means parallel to the frame of said vehicle when collapsed and into chocking position with said wheel when expanded.

3. The apparatus of claim 1 wherein the initial force to expand said second expandable member is derived from the weight of said first expandable member and said chock member and wherein said control means includes means to collapse said second expandable member after said first expandable member is collapsed.

4. The apparatus of claim 3 wherein said second expandable member is expanded by force transmitted through said flexible member from said first expandable member.

5. The apparatus of claim 1 wherein said control means includes compressed air for forcing said first expandable member into expanded and contracted positions.

6. The apparatus of claim 1 including a frame fixed to the underside of said wheeled vehicle and enclosing said chocking means in contracted position to protect said chocking means.

7. The apparatus of claim 1 wherein said chock member is removeable from said first expandable member for independently chocking said wheel.

8. The apparatus of claim 1 wherein said first expandable member includes:
(a) an air expandable and contractable piston,
(b) a rod and cylinder guide means, and
(c) a pair of mating cylinders said piston being operable to expand said rod from said cylinder, said piston being operable to contract said rod into said cylinder, and said rod and cylinder guiding the expansion and contraction of said mating cylinders.

9. The chocking means of claim 1 wherein said control means includes:
(a) a source of compressed air to expand and contract said first and second expandable members,
(b) a delay valving system to delay expansion of said second expandable member until said first expandable member has been expanded, and
(c) a further valve means prohibiting contraction of said second expandable member until said first expandable member has been substantially fully contracted.

* * * * *